(12) United States Patent
Ahlquist

(10) Patent No.: US 9,058,491 B1
(45) Date of Patent: Jun. 16, 2015

(54) ENABLING A SECURE BOOT FROM NON-VOLATILE MEMORY

(75) Inventor: Brent Ahlquist, Loomis, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 683 days.

(21) Appl. No.: 12/411,784

(22) Filed: Mar. 26, 2009

(51) Int. Cl.
*G06F 21/57* (2013.01)
*G06F 21/79* (2013.01)

(52) U.S. Cl.
CPC .............. *G06F 21/575* (2013.01); *G06F 21/79* (2013.01); *G06F 21/57* (2013.01)

(58) Field of Classification Search
CPC ........ G06F 21/575; G06F 21/79; G06F 21/57
USPC .................................................. 713/1–2, 189
See application file for complete search history.

(56) References Cited

U.S. PATENT DOCUMENTS

| | | | | |
|---|---|---|---|---|
| 5,937,063 | A * | 8/1999 | Davis | 713/187 |
| 6,138,236 | A * | 10/2000 | Mirov et al. | 726/26 |
| 6,185,678 | B1 * | 2/2001 | Arbaugh et al. | 713/2 |
| 6,409,089 | B1 * | 6/2002 | Eskicioglu | 235/492 |
| 6,928,548 | B1 | 8/2005 | Hale et al. | |
| 7,380,275 | B2 * | 5/2008 | Srinivasan et al. | 726/17 |
| 7,873,837 | B1 * | 1/2011 | Lee et al. | 713/189 |
| 8,181,034 | B2 | 5/2012 | Elbaum et al. | |
| 8,332,652 | B2 * | 12/2012 | Boivie et al. | 713/187 |
| 8,364,975 | B2 * | 1/2013 | Kumar et al. | 713/189 |
| 8,560,823 | B1 * | 10/2013 | Aytek et al. | 713/2 |
| 2002/0087877 | A1 * | 7/2002 | Grawrock | 713/200 |
| 2003/0018892 | A1 * | 1/2003 | Tello | 713/164 |
| 2003/0126454 | A1 | 7/2003 | Glew et al. | |
| 2004/0025036 | A1 * | 2/2004 | Balard et al. | 713/189 |
| 2004/0088559 | A1 * | 5/2004 | Foster et al. | 713/193 |
| 2005/0066169 | A1 | 3/2005 | Kiehtreiber et al. | |
| 2005/0097052 | A1 | 5/2005 | Systa et al. | |
| 2005/0114338 | A1 | 5/2005 | Borthakur et al. | |
| 2005/0132186 | A1 * | 6/2005 | Khan et al. | 713/165 |
| 2005/0138409 | A1 * | 6/2005 | Sheriff et al. | 713/200 |
| 2005/0289343 | A1 * | 12/2005 | Tahan | 713/169 |
| 2006/0026417 | A1 * | 2/2006 | Furusawa et al. | 713/2 |
| 2006/0048221 | A1 | 3/2006 | Morais et al. | |
| 2006/0090084 | A1 * | 4/2006 | Buer | 713/189 |
| 2007/0061897 | A1 * | 3/2007 | Holtzman et al. | 726/34 |
| 2007/0192610 | A1 * | 8/2007 | Chun et al. | 713/176 |
| 2007/0300068 | A1 | 12/2007 | Rudelic | |
| 2008/0101109 | A1 | 5/2008 | Haring-Bolivar et al. | |

(Continued)

OTHER PUBLICATIONS

Arbaugh, Secure and reliable bootstrap architecture, Security and Privacy Proceedings, pp. 65-71 (IEEE 1997).*

(Continued)

*Primary Examiner* — Jung Kim
*Assistant Examiner* — Theodore Parsons
(74) *Attorney, Agent, or Firm* — Dorsey & Whitney LLP

(57) ABSTRACT

A system may include a host that may include a processor coupled to a non-volatile memory over a secure communication protocol. As a result, prior to release for manufacturing, a binding code may be established between the host and the non-volatile memory. In some embodiments, this binding code may be stored on the non-volatile memory and not on the host. Then during a boot up of the system, the boot up process may be initiated by the host using code associated with the host, followed by secure booting using the secure protocol using code stored on the non-volatile memory.

18 Claims, 1 Drawing Sheet

(56) References Cited

U.S. PATENT DOCUMENTS

| | | |
|---|---|---|
| 2008/0104416 A1 | 5/2008 | Challener et al. |
| 2008/0155275 A1* | 6/2008 | Natarajan et al. ............. 713/193 |
| 2008/0165952 A1* | 7/2008 | Smith et al. .................... 380/28 |
| 2008/0244269 A1* | 10/2008 | Ishibashi et al. .............. 713/175 |
| 2009/0094597 A1* | 4/2009 | Moskalik et al. ............. 717/174 |
| 2009/0113215 A1 | 4/2009 | Aharonov |
| 2009/0285390 A1* | 11/2009 | Scherer et al. .................. 380/44 |
| 2009/0319782 A1* | 12/2009 | Lee ................................ 713/156 |
| 2010/0082961 A1* | 4/2010 | Gurumoorthy et al. .......... 713/2 |
| 2011/0131447 A1 | 6/2011 | Prakash et al. |
| 2011/0145600 A1 | 6/2011 | Rudelic |
| 2012/0084438 A1* | 4/2012 | Raleigh et al. ................ 709/224 |
| 2012/0143967 A1* | 6/2012 | Leonard ........................ 709/206 |

OTHER PUBLICATIONS

Dietrich, Secure Boot Revisited, 9th International Conference for Young Computer Scientists, ICYCS, pp. 2360-2365 (IEEE Nov. 18-21, 2008).*

Curry, Ian, "An Introduction to Cryptography and Digital Signatures", Entrust, Online: www.netrust.net/docs/whitepapers/cryptointro.pdf, Mar. 2001.

Sivathanu, G. et al., "Ensuring Data Integrity in Storage: Techniques and Applications", ACM, StorageSS '05, Nov. 11, 2005.

* cited by examiner

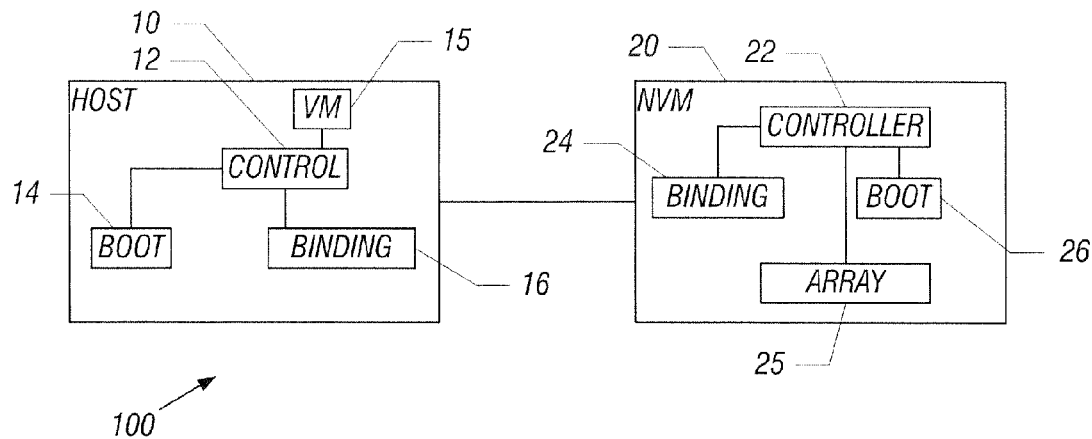
FIG. 1
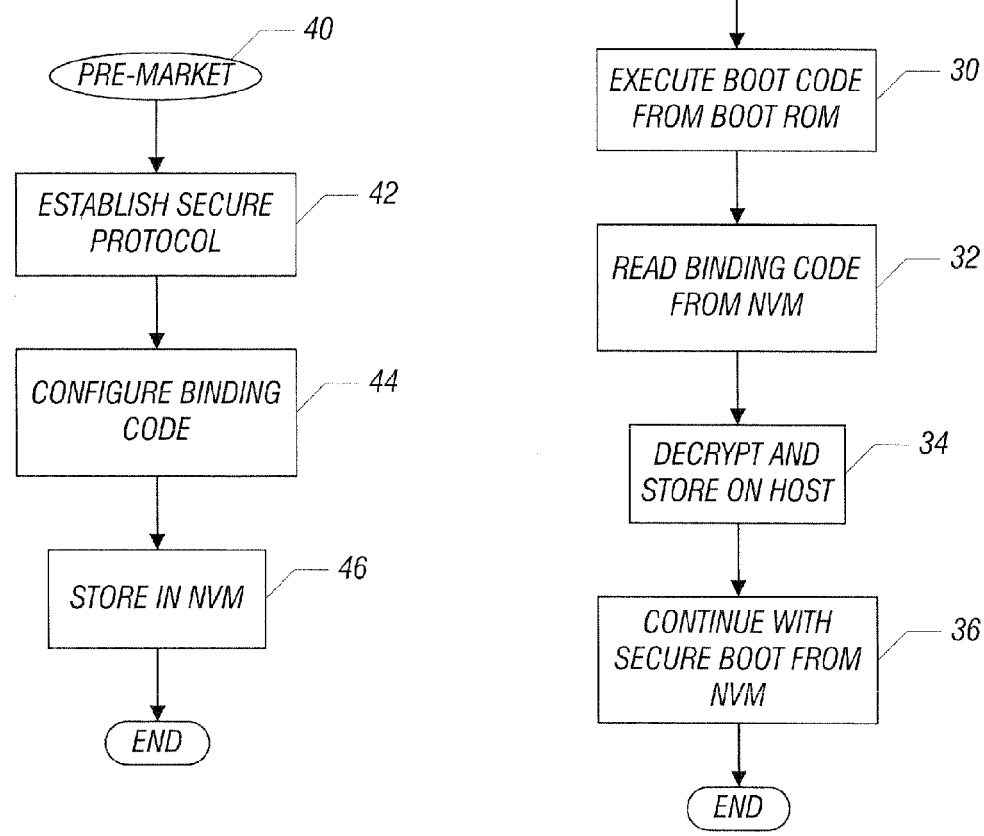
FIG. 2
FIG. 3

ENABLING A SECURE BOOT FROM NON-VOLATILE MEMORY

BACKGROUND

This relates generally to processor-based systems and, particularly, to systems for enabling secure booting of processor-based systems.

Conventionally, processor-based systems may involve a processor and a storage that stores code for enabling the system to boot. In many cases, the processor itself may be capable of operating in a secure environment. However, communications between the processor and various non-volatile memories, made by entities other than the processor manufacturer that may be paired in systems with the processor, are not always secure. Thus, an interloper may affect the operation of the system by compromising communications between the non-volatile memory and the processor.

BRIEF DESCRIPTION OF THE DRAWINGS

FIG. 1 is a circuit schematic for one embodiment of the present invention;

FIG. 2 is a flow chart for a pre-market release security binding between a processor and a non-volatile memory for one embodiment; and FIG. 3 is a secure boot protocol in accordance with some embodiments of the present invention.

DETAILED DESCRIPTION

Referring to FIG. 1, a processor-based system 100 may include a host 10 and a non-volatile memory 20. The host 10 may include a processor such as a microprocessor, a controller or a digital signal processor. The system 100 may be any type of processor-based device, including a laptop computer, a desktop computer, a personal digital assistant, a camera, an imaging device, a wireless communication device, such as a cell phone, a media player, or a set top box, to mention a few examples. The non-volatile memory may be a flash memory, a static random memory, or a phase change memory to, mention a few examples. In one embodiment, the memory 20 is a flash memory that has an execute-in-place (XIP) functionality.

In accordance with some embodiments, secure communications and secure booting of the processor-based system may be implemented using code that may be stored, at least in part, on the non-volatile memory 20. This may be done, in some embodiments, without requiring any permanent storage of code, keys, or other material on the host 10 itself. Thus, in some embodiments, the host 10 may not need to be adapted by the processor manufacturer to the specific requirements needed to implement secure communications and booting with any particular non-volatile memory 20.

Referring to FIG. 1, the host 10 may include a controller 12, which may be a microprocessor in one embodiment. In one embodiment, the host 10 may be a chipset. A boot read only memory (ROM) 14, coupled to the controller, in some embodiments, includes basic boot code to boot the system 100. In some embodiments, the boot may initially be implemented with the boot code stored on the boot ROM 14, with booting continuing through the execution of code stored on the non-volatile memory 20 in the boot code storage 24.

The host 10 may also include a binding code storage 16. While, initially, this code storage may be empty, it may be any memory available on the host 10 to at least temporarily store information to enable secure communications and booting with the non-volatile memory 20. Thus, in some embodiments, the binding code storage 16 may be volatile memory (i.e. dynamic random access memory (DRAM)) and, particularly, system memory.

The memory 20 may also include its own controller 22 coupled to the boot code storage 26. It may also include the binding code storage 24 that normally stores the binding code after an initialization process with the host 10. Prior to distribution of the system 100, binding code may be stored in the binding code storage 24 to facilitate communications and booting between the host 10 and the non-volatile memory 20.

Specifically, referring to FIG. 2, prior to market release of the system 100, the pre-market release sequence 40 may be implemented. The sequence 40 may be implemented in hardware or software. In a software embodiment, it may be implemented by a computer readable medium storing instructions executable by a processor. The medium may be a magnetic, semiconductor, or optical storage.

The sequence 40 may be implemented prior to marketing or use of the system 100. For example, it may be implemented by the system manufacturer. In a software implementation, code for the sequence 40 need not be permanently stored on the host 10. Nevertheless, a secure communication protocol may be established between the host and the non-volatile memory 20, as indicated in block 42.

In one embodiment, the host 10 may generate a bind command and parameters and send the command and parameters to the non-volatile memory 20. The bind command and parameters may be generated by the host controller 12 and may be sent to the target non-volatile memory 20. The parameters may convey the key type, for example, a keyed-hash message authentication code (HMAC) or other message authentication code or message integrity code, including the data authentication algorithm, message authentication code based on universal hashing (UMAC), cipher-based message authentication code. The parameters, in one embodiment, include X, g, and n, in the Diffie-Hellman key exchange algorithm and a tag to establish the association, location, or an identifier based on the implementation for the host identify a key in the future. X is equal to g^x mod n, where x is equal to a host-generated random number or pseudorandom number, and g and n are chosen according to the desired key type, key strength, and requirements of the Diffie-Hellman algorithm. The tag is implementation or system specific.

The host accesses a response from the non-volatile memory 20 and extracts the secret key from the response using the Diffie-Hellman algorithm in one embodiment. The key is then temporarily secured in volatile memory (VM) 15, for example, in order to enable secure communications between the host 10 and the non-volatile memory 20 in the pre-market release stage (block 42 of FIG. 2).

The host 10 then configures binding code for host-to-memory binding, as indicated in block 44 of FIG. 2. The host may be provided with non-volatile memory specific code. The host encrypts the secret key. Then the host may encrypt and sign (by adding an identifier to the encrypted binding code data) the binding code. Signing the binding code may then be stored (FIG. 2, block 46) in a known location in a non-volatile memory 20 dedicated to binding code storage and, particularly, in the embodiment illustrated in FIG. 1, the binding code storage 24. Thereafter, the system 100 may be sold or transferred to an end user who may attempt to boot the system 100.

In order to boot the system, the boot code 14, shown in FIG. 3, may be utilized. The sequence 14 may be implemented in hardware or software. In a software embodiment, it may be implemented by a computer readable medium storing instructions executable by a processor. The medium may be a magnetic, semiconductor, or optical storage.

Initially, the boot code may be stored in the boot ROM 14. The boot code from the boot ROM may be executed, as indicated in block 30. In response to execution of that boot code, a command to read binding code from the non-volatile memory 20 is issued, as indicated in block 32. Thus, the boot code reads the binding code stored at a known location on the memory 20.

The binding code is decrypted by the host 10 and then stored on the host in the binding code storage 16 (block 34). Then, the boot process continues by reading code from the boot code 26 on the memory 20 (block 36). In one embodiment, this code may be executed in place. A secure communication protocol can be established using the binding code storage pursuant to Diffie-Hellman or any other protocol. The non-volatile memory responds to the parameters from the host by generating a random or pseudorandom number y.

The non-volatile memory 20 then generates and stores in its memory, according to association tag k', where k' is equal to X^x mod n, according to the Diffie-Hellman algorithm as the secret key of a key type. Then the non-volatile memory responds to the host with Y=g^x mod n. The response may request that the host perform a mastered read of response data.

A host device, upon receiving the response, calculates k' equal Y^x mod n from known elements and values provided by the non-volatile memory to obtain the secret key k'. Then, a confidential immutable encryption key (HK) may be encrypt, separately or together, a block of secret key k'. This may be done using all non-volatile memory specific security code since it may not be desirable to store, in the host device memories, information used to support authentication and secure boot processes for particular non-volatile memories. A host-specific mechanism to trigger the execution of this step and manage the process of encrypting the key and code base to be stored may be managed by the host processor and, particularly, may be implemented by a suitable hook contained in the basic boot code stored in association with the host 10.

During the boot process, the host begins by executing code from its boot ROM 14 to access the encrypted blocks in the non-volatile memory 20, decrypt them and relocate the necessary code and secret key to the host internal secure volatile memory 15. Then that key and security code is used to authenticate the remaining code, data, and security characteristics stored in the non-volatile memory. As a result, the secret key may be transferred to the secure non-volatile memory in a secure fashion. Thus, an insecure factory environment may be utilized to assemble the secure system 100.

Security features in processors used in the host 10 may include substantial security capabilities to support that process. In some embodiments, it may be advantageous that the non-volatile memory be an execute-in-place device.

Thus, in some embodiments, it is not necessary to provide a secure factory environment for building the basic system. In addition, the processor is not burdened with any non-volatile memory specific security protocols.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: generating, using a controller of a hose, a bind command and one or more parameters indicative of a key type and including an identification tag; providing the bind command and the one or more parameters to a non-volatile memory, the non-volatile memory comprising an execute-in-place memory; receiving, at the controller of the host, a response associated with the bind command from a controller of the non-volatile memory; enabling secure communications between the host and the non-volatile memory based, at least in part, on the response; configuring, using the controller of the host, binding code to enable encrypted communications between the host and the non-volatile memory including encrypting the binding code with the host, wherein the binding code is configured to be executed by the host; and storing the encrypted binding code in binding code storage of the non-volatile memory, the binding code storage dedicated to storing the binding code.

2. The method of claim 1, wherein the one or more parameters correspond to a Diffie-Hellman key exchange algorithm.

3. The method of claim 1, further including storing a boot code on the non-volatile memory.

4. The method of claim 3, wherein the boot code is a first boot code, the method further including enabling a second boot code on the host to initiate a boot and transferring the booting process to the first boot code stored on the non-volatile memory.

5. The method of claim 4, further including executing the binding code to facilitate transfer of the first boot code from the non-volatile memory to the host.

6. A non-volatile memory, comprising: a binding code storage configured to store binding code; a boot code storage separate from the binding code storage and configured to store boot code; a controller coupled to each of the binding code storage and the boot code storage and configured to provide the binding code; wherein the binding code comprises code executable by a host to establish a encrypted communication protocol with the non-volatile memory and wherein the controller is further configured to provide the boot code in accordance with the secure communication protocol.

7. The non-volatile memory of claim 6, wherein the non-volatile memory comprises an execute-in-place memory.

8. The non-volatile memory of claim 6, wherein the non-volatile, memory comprises flash memory.

9. The non-volatile memory of claim 6, further comprising a boot code storage configured to store boot code for booting, at least in part, a host.

10. The non-volatile memory of claim 9, wherein the controller is further configured to enable the boot code to be executed in place within the memory using the secure communication protocol.

11. The non-volatile memory of claim 6, wherein the binding code comprises a Diffie-Hellman key exchange algorithm.

12. A system comprising: a host configured to generate a bind command; a non-volatile memory coupled to the host and including a controller, the controller configured to receive the bind command and one or more parameters indicative of a key type and including an identification tag and generate a response to the bind command including a parameter for enabling an encrypted communication protocol, the controller further configured to provide the response to the host, wherein the host is further configured to configure binding code based, at least in part, on the response and provide the binding code to binding code storage of the non-volatile memory dedicated to storing the binding code and wherein the binding code includes code for establishing the encrypted communication protocol between the non-volatile memory and the host, wherein the binding code is configured to be executed by the host, and wherein the non-volatile memory is configured to operate as an execute-in-place memory.

13. The system of claim 12, wherein the non-volatile memory comprises flash memory.

14. The system of claim 12, wherein the non-volatile memory is further configured to store boot code for the host, the host further configured to execute the boot code responsive, at least in part, to a secure communication protocol being established between the non-volatile memory and the host.

15. The system of claim 14, wherein the memory enables the boot code to be executed in place within the memory by the host over the secure communication protocol.

16. The system of claim 12, wherein the host is further configured to generate the bind command responsive to executing boot code.

17. The system of claim 12, wherein the response comprises a key corresponding to a Diffie-Hellman key exchange algorithm.

18. The system of claim 17, wherein the host is further configured to encrypt the key.

* * * * *